Nov. 21, 1933.  E. A. ROCKWELL  1,936,175
INPUT LINKAGE CONTROL FOR POWER BRAKE UNITS
Filed Feb. 20, 1932
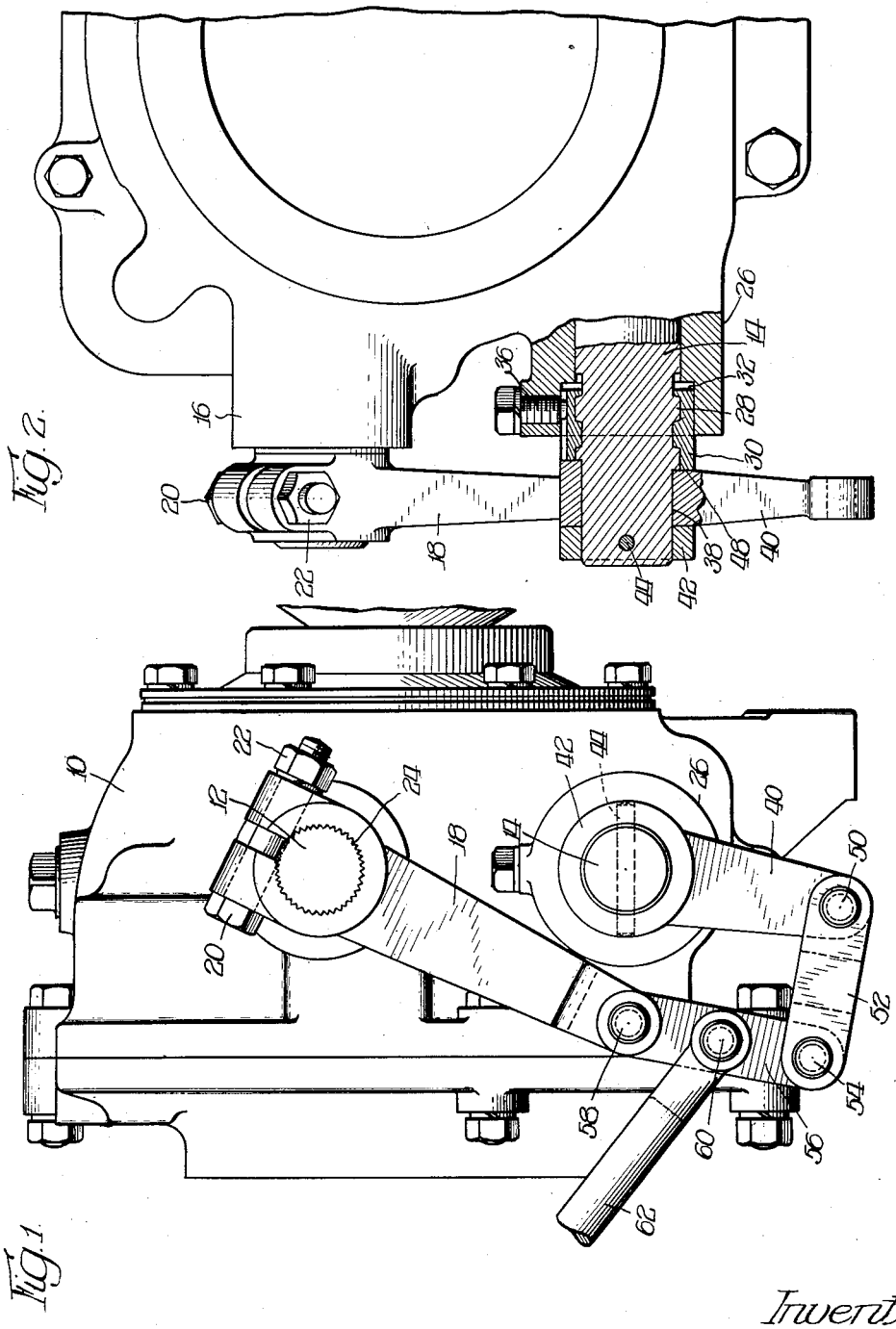
Inventor:
Edward A. Rockwell,

UNITED STATES PATENT OFFICE 1,936,175

INPUT LINKAGE CONTROL FOR POWER BRAKE UNITS

Edward A. Rockwell, Chicago, Ill.

Application February 20, 1932. Serial No. 594,220

4 Claims. (Cl. 188—140)

This invention relates to an input linkage control for power brake units adapted to be used in a mechanical power brake system of a motor vehicle.

I have disclosed in my application, Serial No. 516,888 filed February 19, 1931, a mechanical power brake unit according to which the input pressure developed by the usual brake pedal is amplified through the rotation of the propeller shaft of the vehicle and transmitted through the output of the power brake unit to the brake linkage which is connected to actuate the wheel brakes of the vehicle. It is comparatively an easy matter when a mechanical power brake is used to have a brake pedal which is operative with a comparatively light foot pressure to fully apply the brakes and by a relatively short travel of the pedal. However, if the operator of the vehicle is not accustomed to the pedal action, trouble may occur due to the application of the foot pressure too suddenly or too heavily to the pedal. In such case the slack in the brake linkage between the power brake and the wheel brakes may be taken up too quickly or the wheel brakes may be too strongly applied, thereby interfering with a smooth and even braking action. In my application above referred to, I have shown an input dash pot which initially opposes the foot pressure in order to obtain a gradual and smooth brake application.

It is a purpose of the present invention to accomplish the desired result of obtaining a smooth and even braking action when a mechanical power brake is used by initially limiting the input movement pressure applied to the power brake through a connection between the input and the output and permitting a gradual increase of the input pressure as the output of the power brake becomes effective.

Further objects and advantages of the present invention will be more readily apparent from the following description taken in connection with the attached drawing, in which Figure 1 is a side elevation of the power brake showing the improved linkage control, and Figure 2 is an elevation taken from the rear of Figure 1 and partially shown in section.

The power brake design is substantially similar to that disclosed in my application above referred to, except that an input dash pot need not be employed. The power brake includes a casing 10 supporting an input rock shaft 12 and an output rock shaft 14. The input rock shaft 12 extends through a boss 16 of the casing 10 and has secured to its protruding end an input lever arm 18 which has a split end clamped by bolt 20 and nut 22 tightly to the serrated portion 24 of the rock shaft 12. The output rock shaft 14 extends through a boss 26 of casing 10 and is formed with an external screw thread 28 upon which is threaded a sleeve 30 having an internal screw thread 32. The sleeve 30 is received within a cut-out portion 32 of the boss 26. A screw bolt 36 is threaded through the boss 26 and engages a groove in the sleeve 30 to prevent rotation thereof. The screw threads 28 and 32 are so designed that clockwise rotation of the rock shaft 14, looking at Figure 1, will cause the sleeve 30 to move axially outwardly. The clockwise rotation of shaft 14 is the releasing movement thereof and therefore in normal position the sleeve 30 is forced outwardly. Rotatably mounted on the reduced portion 38 of the rock shaft 14 is a lever arm 40 which is held against displacement from the shaft 14 by an abutment washer 42 secured by pin 44 to the outer end of the shaft 14. The lever arm 40 has a cam face on its inner side formed complementary to and adapted to engage at 48 a cam face upon the outer end of sleeve 30. It will therefore be understood that the sleeve 30 in normal position will hold the lever arm 40 against movement.

The arm 40 carries a pivot pin 50 to which is pivotally connected a toggle link 52. The link 52 is secured by pivot pin 54 to a second toggle link 56 which in turn is pivotally connected at its other end to a pivot pin 58 carried by input lever arm 18. The link 56 intermediate its ends carries a pivot pin 60 to which is connected the input tension rod 62. The rod 62 is connected to the usual brake pedal.

With this arrangement it will be understood that application of foot pressure to the brake pedal will move the rod 62. Since the lever arm 40 is initially held in stationary position the pivot point 50 will remain fixed, but the links 56 and 52 will tend to straighten out as the input lever arm 18 is rotated in a clockwise direction. As soon as the power brake becomes effective the output rock shaft 14 will start to rotate in a counterclockwise direction and the sleeve 30, due to the screw threaded connection with the rock shaft 14, will tend to move inwardly thereby releasing the lever arm 40. The arm 40 will therefore be free to rotate in a clockwise direction and as the pivot point 58 remains stationary, it will be obvious that the input braking pressure is decreased and the pedal is permitted to have a further travel. In order to maintain the same degree of input pressure to the power brake, it is necessary for the operator to continue the foot pressure upon the pedal throughout the movement permitted as the arm 40 follows up the retraction of the sleeve 30. By maintaining an even pressure upon the brake pedal, the linkage will maintain an even and gradual increase of the input pressure to the power brake and result in a smooth and even braking action.

I claim:

1. In combination with a power brake having input and output rock shafts, an input lever arm secured to said input rock shaft, an arm mounted on said output rock shaft and normally held against movement relative thereto, a pair of toggle links pivotally connected to said input lever arm and to the arm carried by said output rock shaft, pedal-controlled means connected to one of said toggle links for moving said input lever arm and means operative upon actuating movement of said output rock shaft for releasing the arm carried thereby in order to cause a decrease of the input pressure to the power brake.

2. In combination, a power brake having input and output rock shafts, an input lever arm secured to said input rock shaft, an arm mounted on said output rock shaft, a pair of toggle links pivotally connected to said last-mentioned arm and to said input lever arm, a brake applying member connected to one of said toggle links and means associated with said output rock shaft normally preventing movement of the arm carried thereby relative thereto, said means being adapted to release said arm upon actuating movement of said output rock shaft in order to permit further movement of the input linkage to the power brake.

3. In combination with a power brake, input and output rock shafts, a lever arm movable with said input rock shaft, input linkage for applying said power brake through movement of said lever arm and means controlled by movement of said output rock shaft for initially limiting the movement of said input linkage and permitting further movement thereof as the output rock shaft is rotated through actuation of the power brake.

4. In combination with a power brake having input and output rock shafts, a lever arm secured to said input rock shaft, a lever arm supported by said output rock shaft, an abutment member on one side of said last-mentioned lever arm held against axial movement relative to said output rock shaft, an axially movable spiral sleeve on the other side of said lever arm, said sleeve being in threaded engagement with said output rock shaft and means for preventing rotation of said spiral sleeve relative to said rock shaft whereby, in released position of said output rock shaft, said spiral sleeve bears against the lever arm to prevent movement thereof, and input linkage pivotally connected to both of said lever arms for applying said power brake.

EDWARD A. ROCKWELL.